(12) United States Patent
Crutcher et al.

(10) Patent No.: US 7,881,282 B2
(45) Date of Patent: Feb. 1, 2011

(54) SYSTEM AND METHOD FOR INTERFACING A BROADBAND NETWORK AND A CIRCUIT SWITCHED NETWORK

(75) Inventors: Mark A. Crutcher, Dallas, TX (US); Randal E. Waters, McKinney, TX (US); Craig W. Miller, Plano, TX (US)

(73) Assignee: Data Connection Ltd., Enfield (GB)

( * ) Notice: Subject to any disclaimer, the term of this patent is extended or adjusted under 35 U.S.C. 154(b) by 1825 days.

(21) Appl. No.: 10/919,740

(22) Filed: Aug. 17, 2004

(65) Prior Publication Data

US 2005/0018662 A1    Jan. 27, 2005

Related U.S. Application Data

(63) Continuation of application No. 10/369,413, filed on Feb. 18, 2003, now Pat. No. 6,816,482.

(60) Provisional application No. 60/357,672, filed on Feb. 19, 2002.

(51) Int. Cl.
*H04L 12/66* (2006.01)
(52) U.S. Cl. .................. 370/352; 370/401
(58) Field of Classification Search ......... 370/352–357, 370/401, 230, 235
See application file for complete search history.

(56) References Cited

U.S. PATENT DOCUMENTS

| | | | |
|---|---|---|---|
| 5,608,720 A * | 3/1997 | Biegel et al. | 370/249 |
| 6,026,087 A | 2/2000 | Mirashrafi et al. | |
| 6,141,341 A * | 10/2000 | Jones et al. | 370/352 |
| 6,173,044 B1 * | 1/2001 | Hortensius et al. | 379/93.09 |
| 6,229,810 B1 | 5/2001 | Gerszberg et al. | |
| 6,295,457 B1 | 9/2001 | Narayanaswamy | |
| 6,327,358 B1 * | 12/2001 | March et al. | 379/221.01 |
| 6,339,594 B1 * | 1/2002 | Civanlar et al. | 370/352 |
| 6,483,912 B1 | 11/2002 | Kalmanek et al. | |

(Continued)

FOREIGN PATENT DOCUMENTS

EP    0909064 A2    4/1999

(Continued)

OTHER PUBLICATIONS

European Search Report from European Patent Application No. 03742799.4 dated Jan. 30, 2008.

*Primary Examiner*—Fan Tsang
*Assistant Examiner*—Akelaw A Teshale
(74) *Attorney, Agent, or Firm*—Haynes and Boone LLP

(57) ABSTRACT

A method is provided managing a call using a digital communication device, where the device provides an interface between a public broadband network and a public circuit switched network. In one example, the method includes receiving a request at the device from either the broadband or circuit switched network to establish the call and identifying a destination for the call. A path from the requesting network to the destination is determined, where the determination identifies whether the path will use one or both of the broadband and circuit switched networks. The call is routed via the path, and the device identifies the destination, determines the path, and routes the call without using any resources associated with the circuit switched network if the path does not include the circuit switched network.

2 Claims, 3 Drawing Sheets

U.S. PATENT DOCUMENTS

| | | | |
|---|---|---|---|
| 6,542,499 B1 * | 4/2003 | Murphy et al. | 370/352 |
| 6,563,816 B1 | 5/2003 | Nodoushani et al. | |
| 6,574,335 B1 | 6/2003 | Kalmanek et al. | |
| 6,577,718 B1 | 6/2003 | Kalmanek et al. | |
| 6,680,935 B1 | 1/2004 | Kung et al. | |
| 6,697,475 B1 | 2/2004 | MeLampy et al. | |
| 6,731,627 B1 | 5/2004 | Gupta et al. | |
| 6,747,970 B1 * | 6/2004 | Lamb et al. | 370/352 |
| 6,816,482 B2 * | 11/2004 | Crutcher et al. | 370/352 |
| 6,868,080 B1 * | 3/2005 | Umansky et al. | 370/354 |
| 6,934,258 B1 * | 8/2005 | Smith et al. | 370/238 |
| 6,961,334 B1 * | 11/2005 | Kaczmarczyk | 370/354 |
| 7,113,500 B1 * | 9/2006 | Bollinger et al. | 370/352 |
| 7,203,187 B1 * | 4/2007 | Richardson et al. | 370/352 |
| 2002/0003873 A1 | 1/2002 | Rabenko et al. | |

FOREIGN PATENT DOCUMENTS

| | | |
|---|---|---|
| WO | 00/35157 A1 | 6/2000 |
| WO | 01/05106 A1 | 1/2001 |

* cited by examiner

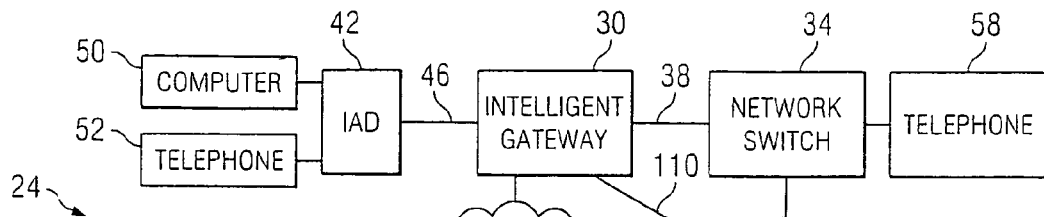
Fig. 5
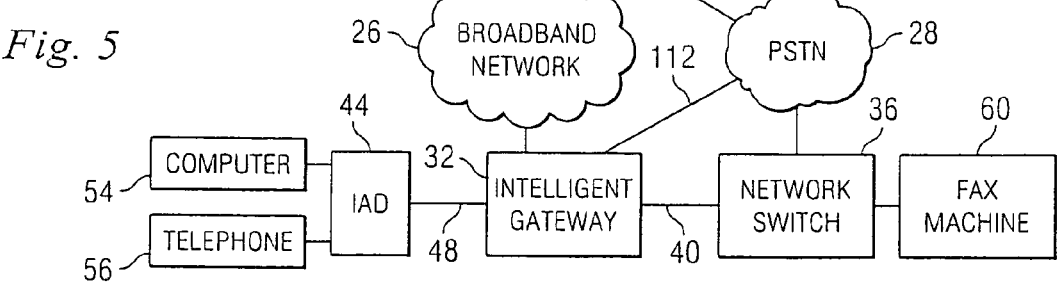
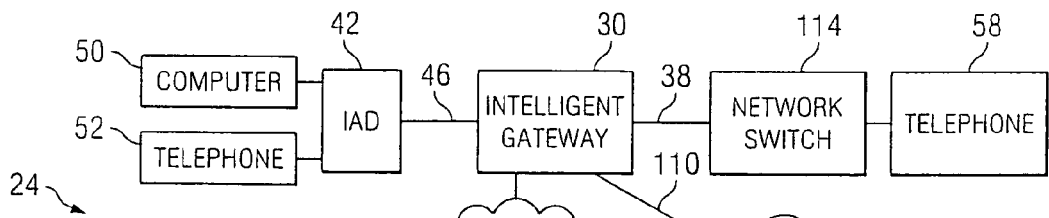
Fig. 6
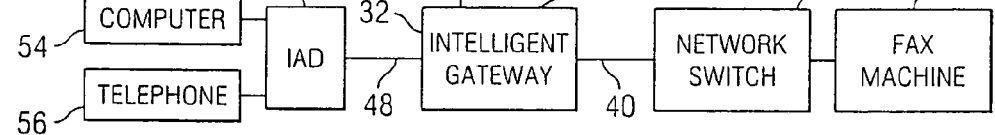
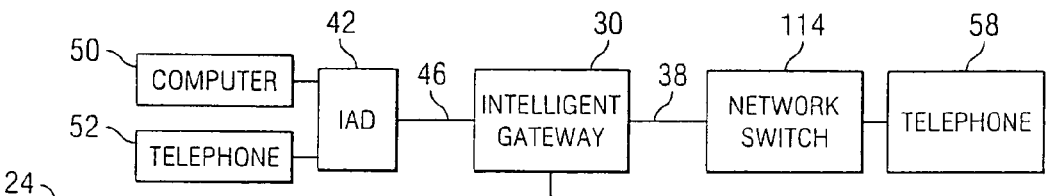
Fig. 7
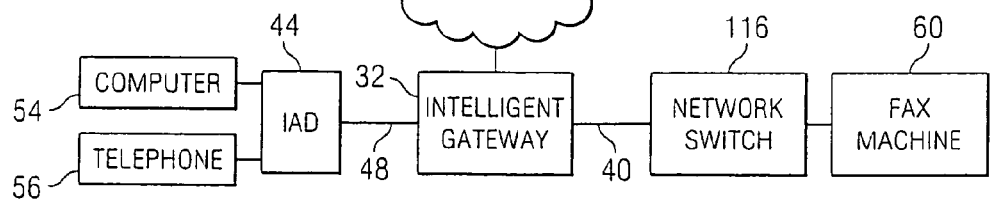

SYSTEM AND METHOD FOR INTERFACING A BROADBAND NETWORK AND A CIRCUIT SWITCHED NETWORK

CROSS-REFERENCE

This application is a continuation of U.S. patent application Ser. No. 10/369,413, filed on Feb. 18, 2003, entitled "SYSTEM AND METHOD FOR INTERFACING A BROADBAND NETWORK AND A CIRCUIT SWITCHED NETWORK", which claims benefit of priority from U.S. Provisional Patent Application Ser. No. 60/357,672, filed on Feb. 19, 2002, entitled "CONFIGURATION FOR BROADBAND NETWORKS INTERFACING THE PUBLIC SWITCHED TELEPHONE NETWORK," both of which incorporated herein by reference.

BACKGROUND

This disclosure relates generally to telecommunication networks and, more specifically, to a system and method for interfacing a broadband network and a circuit switched network.

The communications industry is currently transitioning from legacy circuit switched networks (e.g., public switched telephone networks or PSTNs) that were designed to carry voice traffic to broadband digital networks that are designed to carry both voice and data traffic. Because the circuit switched networks were initially designed to carry voice traffic, they have a number of flaws when viewed from a data network perspective. For example, circuit switched networks dedicate a circuit to a single call for the duration of the call. However, because data tends to be transmitted in bursts, dedicating a circuit to a single call results in wasted bandwidth during times when data is not being transmitted. Furthermore, software created for the legacy hardware components is frequently difficult and expensive to maintain and upgrade.

For these and other reasons, broadband networks are becoming more prevalent. However, as circuit-switched networks are still common, interfaces between the broadband networks and the circuit switched networks are needed until the circuit switched networks are retired.

Part of the difficulty in transitioning from a circuit switched network to a broadband network is a reliance on components found within the circuit switched network. For example, broadband networks that interface the PSTN may use gateway devices. The gateway devices are generally configured as remote terminals that mediate protocol and signal differences between the broadband network and a switch (e.g., a Class 5 switch) associated with the PSTN.

However, such gateways rely on the Class 5 switches for control and command purposes. This reliance on a switch that resides in the PSTN is undesirable because the Class 5 switch is accessed for each voice call, even if the voice call originates and terminates in the broadband network. In addition, many Class 5 switches are taxed from a resource standpoint due to the changing dynamics of call traffic caused by the Internet. Current broadband network interfaces and configurations are unsuitable for solving these and other issues, such as transitioning services from a circuit switched network to a packet network.

Therefore, what is needed is an improved method and system for interfacing a broadband network and a circuit switched network. For example, it is desirable to shift traffic management from components associated with the circuit switched network to components associated with the broadband network. It is also desirable to transition services from the circuit switched network to the broadband network while maintaining a satisfactory level of service in both networks.

SUMMARY

In response to these and other problems, in one embodiment, a method is provided for managing a call using a digital communication device, wherein the device provides an interface between a public broadband network and a public circuit switched network. The method comprises receiving a request at the device from either the broadband or circuit switched network to establish the call and identifying a destination for the call. A path from the requesting network to the destination is determined, wherein the determination identifies whether the path will use one or both of the broadband and circuit switched networks. The call is routed via the path, wherein the device is operable to identify the destination, determine the path, and route the call without using any resources associated with the circuit switched network if the path does not include the circuit switched network.

BRIEF DESCRIPTION OF THE FIGURES

FIG. 5 is a diagram illustrating another embodiment of the exemplary environment of FIG. 2.

FIG. 6 is a diagram illustrating yet another embodiment of the exemplary environment of FIG. 2.

FIG. 7 is a diagram illustrating still another embodiment of the exemplary environment of FIG. 2.

DETAILED DESCRIPTION

Figure 1:
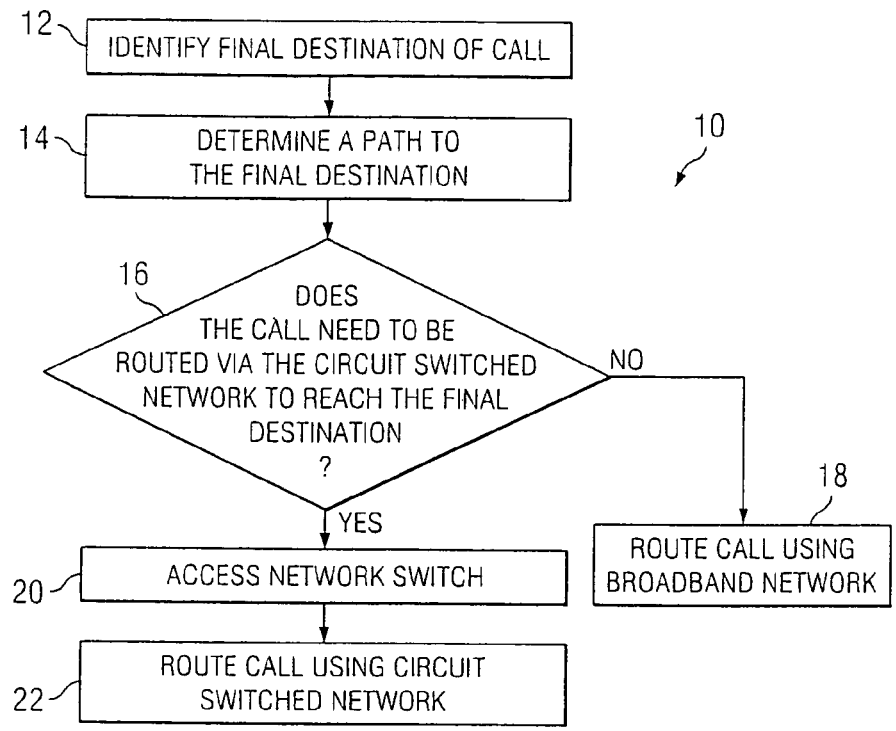
FIG. 1 is a flowchart illustrating a method for managing a voice call by an interface between a broadband network and a circuit switched network.

This disclosure relates generally to telecommunication networks and, more specifically, to a system and method for interfacing a broadband network and a circuit switched network. It is understood, however, that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, in one embodiment, a method 10 is operable to route a voice call to a final destination using either a digital broadband network or a circuit switched network. A network switch that resides in the circuit switched network is used to access the circuit switched network. The choice of networks is based at least partly on the final destination. An exemplary device for executing the method 10 is an intelligent gateway that may be positioned at a convergence point between the two networks, and may access the circuit switched network via the network switch.

In step 12, upon receiving the call, the gateway identifies the final destination of the call. The gateway then determines a path for the call in step 14 and, in step 16, determines whether the path includes the circuit switched network. If it is determined in step 16 that the path does not include the circuit switched network, then the method 10 continues to step 18 and routes the call using the broadband network. However, if it is determined in step 16 that the path does include the circuit switched network, then the method 10 continues to steps 20 and 22, where the network switch is accessed and the call is routed using the circuit switched network.

Accordingly, the method 10 enables a voice call received from a broadband network to be routed without accessing the network switch unless the circuit switched network is required for routing the call. Additional details may be found in U.S. Provisional Patent Application Ser. No. 60/357,672, filed on Feb. 19, 2002, and entitled "CONFIGURATION FOR BROADBAND NETWORKS INTERFACING THE PUBLIC SWITCHED TELEPHONE NETWORK," which is hereby incorporated by reference as if reproduced in its entirety.

Figure 2:
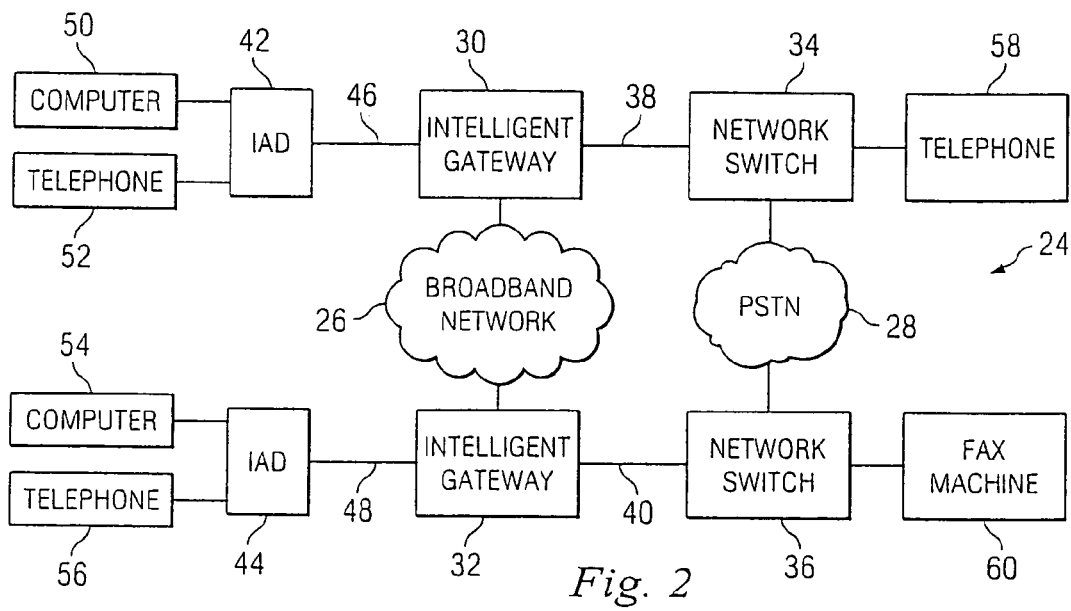
FIG. 2 is a diagram of an exemplary environment in which the method of FIG. 1 may be executed.

Referring now to FIG. 2, in another embodiment, an exemplary communications environment 24 in which the method 10 of FIG. 1 may be executed comprises a broadband network 26 and a circuit switched network 28. In the present example, the broadband network 26 is an asynchronous transfer mode (ATM) or internet protocol (IP) network, and the circuit switched network 28 is a public switched telephone network (PSTN). Two intelligent gateways 30, 32, which are described in greater detail below, are connected to the broadband network 26. Two network switches 34, 36 (e.g., Class 5 switches with Integrated Digital Terminals (IDTs)) are connected to the PSTN 28. In addition, a connection 38 exists between the gateway 30 and the network switch 34, and a connection 40 exists between the gateway 32 and the network switch 36. For purpose of illustration, the connections 38, 40 are compliant with the GR-303 standard.

An integrated access device (IAD) 42 is connected to the gateway 30 via a connection 46 and provides access to the gateway 30 for devices 50, 52. Similarly, another IAD 44 is connected to the gateway 32 via a connection 48 and provides access to the gateway 32 for devices 54, 56. The devices 50-56 represent a variety of devices capable of vocal communications and/or data transfer, such as telephones, computers, fax machines, and personal digital assistants. For purposes of illustration, the devices 50, 54 are computers and the devices 52, 56 are telephones.

The network switches 34, 36 are connected to one or more devices 58, 60 (e.g., telephones, fax machines, etc.), respectively. For purposes of illustration, the device 58 is a telephone, and the device 60 is a fax machine.

It is understood that other network components (not shown) may be deployed. For example, the gateway 30 may be connected to a Digital Subscriber Line Access Multiplexer (DSLAM) via an ATM/IP connection, while the DSLAM may be connected to the IAD 42 via a DSL connection. Alternatively, the gateway 30 may be connected to a cable modem termination system (CMTS) via an IP connection, while the CMTS may be connected to the IAD 42 via a data over cable service interface specification (DOCSIS) compliant connection. Similarly, the broadband network 26 may include routers, servers, and other devices, while the PSTN 28 may comprise a plurality of various devices, such as digital loop carriers. In addition, the network switches 34, 36 may be connected to other devices within the PSTN 28, such Class 4 Access Tandem switches that provide connectivity between the network switches 34, 36 and various long-distance networks.

Figure 3:
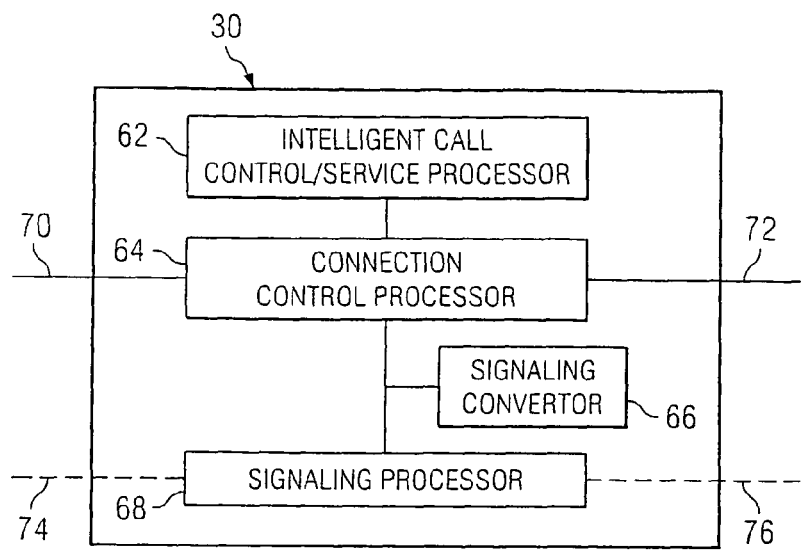
FIG. 3 is an exemplary gateway that may execute the method of FIG. 1 in the environment of FIG. 2.

Referring now to FIG. 3, the intelligent gateway 30 is presented in greater detail. The gateway 30 includes a call control/service processor 62, a connection control processor 64, a signaling converter 66, and a signaling processor 68. The gateway 30 is connected to the IAD 42 via a bearer link 70 and a signaling link 74 (both of which are represented by the connection 46 in FIG. 2), and connected to the network switch 34 via a bearer link 72 and a signaling link 76 (both of which are represented by the connection 38 in FIG. 2).

In conventional gateways that lack the call control/service processor 62, the signal converter 66 and signaling processor 68 are operable to process and convert signals (e.g., mediate between different protocols), and may also direct the connection control processor 64 to establish a connection between the telephone 52 and the network switch 34. However, setting up and establishing the connection would use resources provided by the network switch 34, even if the network switch 34 is not directly involved in the call. For example, a call from the telephone 52 to the telephone 56 would ordinarily require resources from the network switch 34, even if the call was routed through the broadband network 26.

To avoid using the network switch 34 unless needed to access the PSTN network 28, the gateway 30 utilizes the call control/service processor 62 to process and manage call traffic. This is accomplished by using the call control/service processor 62 and associated software to provide different functions to different devices within the environment 24 of FIG. 2. For example, the network switch 34 includes an IDT that is designed to interact with a Remote Digital Terminal (RTD), such as is implemented in the IAD 42. The call control/service processor 62 enables the gateway 30 to behave like an RDT when interacting with the network switch 34, and to behave like an IDT when interacting with the IAD 42. This provides flexibility in deploying the gateway 30, as it may interact with different components without requiring alterations to those components.

Accordingly, the call control/service processor 62 enables the gateway to receive a call (as an IDT) and, depending on information associated with the call, route the call with or without accessing the network switch 34. For example, a telephone call from the telephone 52 to the telephone 56 may be routed through the broadband network 26 by the gateway 30 without any access of the network switch 34. It is understood that the gateway 32 is similar to the gateway 30, and that the functionality and operation of the gateways 30, 32 may be similar.

Referring again to FIG. 1 and with continued reference to FIGS. 2 and 3, in yet another embodiment, an exemplary scenario is used to illustrate the operation of the method 10 within the environment 24 of FIG. 2. In step 12, the gateway 30 receives a signal from the telephone 52. Using information provided by the telephone 52, the gateway 30 identifies the destination of the call as the telephone 56 in step 14. In step 16, the gateway 30 determines a path for the call. As the final destination is the telephone 56, the path may follow the broadband network 26 and does not need to use the circuit switched network 28. Accordingly, after determining that the path does not need to use the circuit switched network 28, the method 10 continues to step 18 and routes the call using the broadband network 26. Each step occurs without accessing the network switch 34 or using any resources of the network switch 34. It is noted that a call from the telephone 52 to another telephone (not shown) that is connected to the IAD 42 would be handled in a similar manner.

Figure 4:
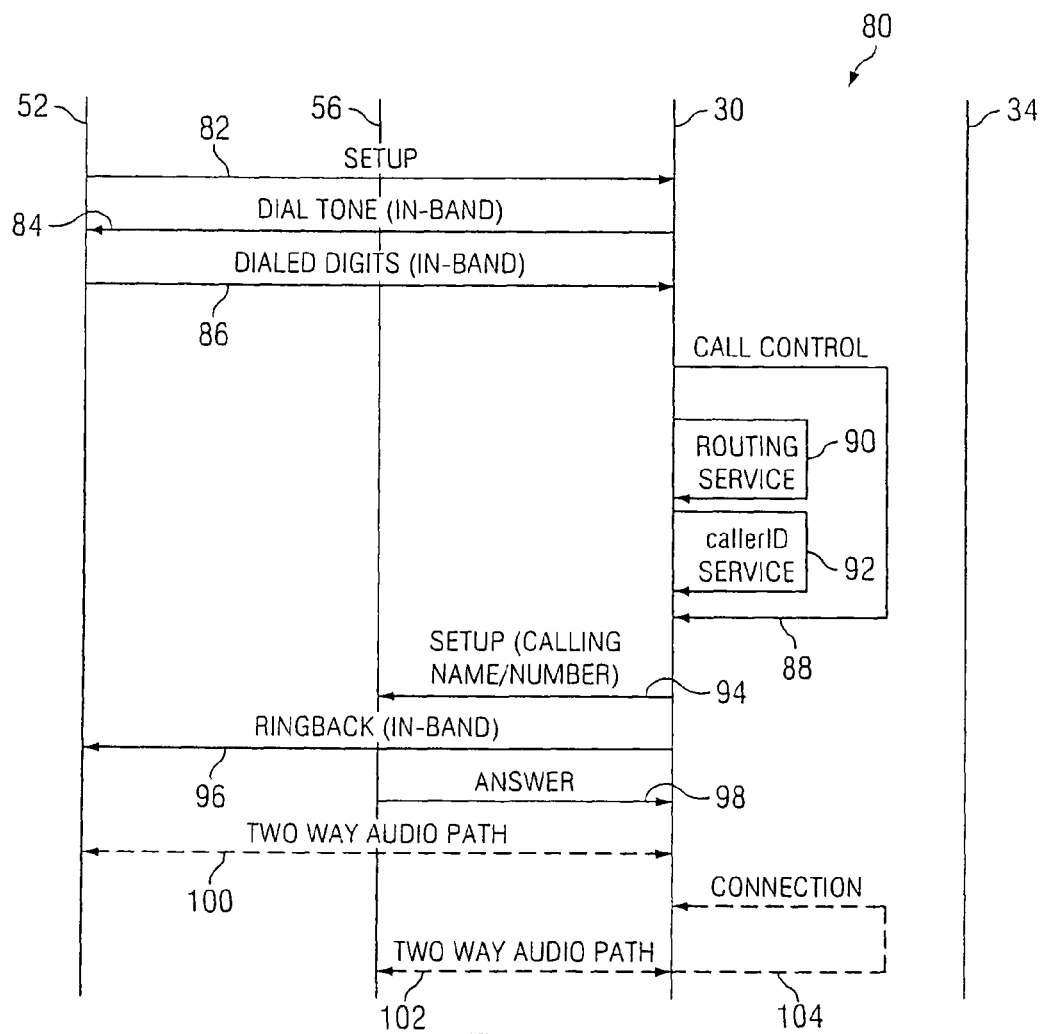
FIG. 4 is an illustrative data flow within the environment of FIG. 2 that may result from the execution of the method of FIG. 1.

Referring now to FIG. 4, in still another embodiment, a call flow 80 illustrates the interaction between the gateway 30 and telephones 52, 56 in greater detail. During the call flow 80, the gateway 30 of FIGS. 2 and 3 is operable to handle a call (that would ordinarily require that the network switch 34 be accessed) without accessing the network switch 34. The call flow begins in step 82 with a setup process. In conventional systems, the setup process would be passed by the gateway 30 to the network switch 34. However, because of the processor 62 and associated command and control software, the gateway 30 receives and processes the incoming setup message without accessing the network switch 34, thereby offloading this task from the PSTN 28. In step 84, the gateway 30 returns a dial tone to the telephone 52, which then sends a destination number to the gateway 30 in step 86. Again, this occurs without any interaction occurring between the gateway 30 and the network switch 34.

In steps 88, 90, and 92, the gateway 30 performs call control, routing service, and caller ID functions, respectively. It is understood that some functions, such as caller ID, may or may not be performed for every call. The gateway 30 contacts the telephone 56 with setup information in step 94 and provides a ringback to the telephone 52 in step 96. When the gateway 30 detects an answer from the telephone 56 in step 98, it establishes a two way audio path in steps 102, 104 to establish a connection 104 between the telephones 52, 56. Without the intelligent call control/service processor 62 and associated control software in the gateway 30, many of the steps 82-104 would require accessing the network switch 34.

Referring again to FIGS. 1-3, in another embodiment, an alternate scenario is described in which the telephone 52 originates a call intended for the telephone 58. In this scenario, the PSTN 28 is be included in the route. In step 12 of FIG. 1, the gateway 30 receives a signal from the telephone 52. Using information provided by the telephone 52, the gateway 30 identifies the destination of the call as the telephone 58 in step 14. In step 16, the gateway 30 determines a route for the call. As the final destination is the telephone 58, the route needs to incorporate the circuit switched network 28.

The gateway 30 originates a call over the GR-303 interface to the network switch 34 in step 20 and routes the call using the circuit switched network in step 22. In the present example, due to software associated with the call control/service processor 62, the gateway 30 appears as a Digital Loop Carrier (DLC) RDT to the network switch 34. As a result, the call origination appears as a line-signaling event to the network switch 34. In addition, the telephone 52 may be provisioned on the network switch 34 since the network switch 34 views the telephone 52 as a line connected to a DLC RDT. Accordingly, the network switch 34 is accessed by the gateway 30 to provide call services as if the call was coming from a DLC RDT (as would ordinarily occur). This enables the gateway 30 to be used in conjunction with the network switch 34 without altering the network switch 34.

Referring still to FIGS. 1-3, in yet another embodiment, an alternate scenario is described in which the telephone 58 originates a call to the telephone 52. In this scenario, the network switch 34 contacts the gateway 30 with a call setup message over the GR-303 compliant connection 38. As is known in the art, another switch (not shown), such as a Class 4 tandem switch associated with the network switch, may be responsible for Local Number Portability (LNP), although the network switch 34 may provide LNP as a last-resort failsafe. Upon receiving the setup message, the gateway 30 may respond to the network switch as if the gateway 30 was a RDT. As previously described, this enables the network switch 34 to operate without needing changes.

The gateway 30 may include other functionality of use in this scenario. For example, as is known in the art, the network switch 34 (e.g., the IDT of the Class 5 switch) keeps track of the busy state of a line and the operational availability of via status messages from an RDT. Accordingly, the network switch does not expect to initiate a setup procedure to a line that was already busy. However, because of the gateway 30, the network switch 34 may not know that the line is busy until a call setup is initiated notifying the gateway 30 of the incoming call. Accordingly, the gateway 30 may connect the telephone 58 (e.g., the inbound caller) to a voice mail service, rather than rejecting the call with a failure cause code.

Referring now to FIG. 5, in still another embodiment, the environment 24 of FIG. 1 is illustrated with modifications that lessen the dependency of the environment 24 on the network switches 34, 36. In the present example, the gateways 30, 32 are given direct trunking access to the PSTN 28 through connections 110, 112 (e.g., inter-machine trunks (IMTs)), respectively, rather than requiring calls bound for the PSTN 28 to traverse the network switches 34, 36.

In this example, the gateway 30 may route certain calls directly to the PSTN 28 via the IMT 110, rather than signaling through the network switch 34. This enables a communications provider (e.g., a carrier) to transition network services slowly and methodically at the carrier's discretion. For example, if the gateway 30 serves subscribers at several business sites, the carrier can open traffic to traverse from the gateway 30 directly to the PSTN 28 for one business site at a time.

To provide this capability, the gateway 30 may support Signaling System 7 (SS7) and Channel Associated Signaling (CAS) trunks, with appropriate feature group signaling, to local and access tandem switches, as well as IMTs. As business sites are selected for direct routing to the PSTN 28, the corresponding subscribers will initially be marked as ported (for local number portability) on the network switch 34. The network switch 34 may route the ported calls to the gateway 30 over IMTs, which provides an interim step for the carrier in localizing routing on the PSTN 28. To further localize the routing, the ported numbers may be marked up one level at the local tandem in the PSTN 28, after which the PSTN 28 may directly route calls for those numbers to the gateway 30.

Additional functionality may be incorporated in the gateway 30, including regulatory functions (e.g., E911, operator services, directory assistance, CALEA, etc.), class and custom call features, and operation functions (e.g., Automated Message Accounting (AMA) formatted call detail records, interfaces to Operational Support Systems (OSSs), etc.).

Referring now to FIG. 6, in another embodiment, the environment 24 of FIG. 5 is illustrated with modifications that further transition the environment 24 towards a broadband solution. In the present example, the network switches 34, 36 are replaced by digital loop carriers (DLCs) 114, 116, respectively. It is understood that one or both of the network switches 34, 36 may have been connected to the DLCs 114, 116 before the removal of the network switches 34, 36. For example, the DLCs 114, 116 may have been previously disposed between the circuit switches 34, 36 and the devices 58, 60 to prepare the environment 24 for the removal of the network switches 34, 36.

Once the network switches 34, 36 are removed from the environment 24, the DLCs 114, 116 may provide connectivity between the gateways 30, 32 and the telephone 58 and fax machine 60 via GR-303. At this time, the gateways 30, 32 may appear as IDTs to the DLCs 114, 116, which enables the DLCs 114, 116 to operate without needing alterations. Removing the network switches 34, 36 enables the gateways 30, 32 to employ switched virtual circuits over the broadband network 26 to route voice calls to any other node in the network without having to traverse intermediate voice switching platforms (e.g., the network switches 34, 36). The gateways 30, 32 enable data to be transferred in packetized streams without regard as to what underlying transport mechanisms are deployed.

Furthermore, the broadband network 26 and the call control/service processor 62 associated with each gateway also enable the gateways 30, 32 to interconnect with one another over virtual circuits and operate as a single distributed logical switch, rather than several smaller separate switching nodes. For example, implementing switch communications infrastructure software in each gateway 30, 32 provides for transparent routing of messages and sharing of data across multiple platforms. Large routing databases (not shown) may be distributed over the various nodes comprising the distributed virtual switch along with subscriber data, call states, etc. The broadband network 26 may substitute for local busses in legacy switch system architectures (e.g., the PSTN 28). The virtual switch capability enables carriers to be flexible when engineering networks. For example, nodes can represent a single end office switch or may be combined to form a large virtual end office switch depending on the nature of traffic patterns, routing schemes, numbering plans, and subscriber profiles.

Referring now to FIG. 7, in still another embodiment, the environment 24 of FIG. 6 is illustrated after a complete transition to the broadband network 26. The PSTN 28 of FIG. 6 is no longer needed, as the gateways 30, 32 are operable to manage all voice (and data) traffic in the environment 24.

While the preceding description shows and describes one or more embodiments, it will be understood by those skilled in the art that various changes in form and detail may be made therein without departing from the spirit and scope of the present disclosure. Therefore, the claims should be interpreted in a broad manner, consistent with the present disclosure.

What is claimed is:

1. A method for managing a communications session using a gateway device, the method comprising:

positioning the gateway device logically at a convergence point between a circuit switch network and a broadband network, wherein the gateway device is operable to act as an integrated digital terminal when interfacing with the broadband network and operable to act as a remote digital terminal when interfacing with the circuit switch network;

intercepting a call request sent to a resource of the circuit switch network with the gateway device such that the gateway device determines whether to prevent the request from reaching the resource of the circuit switched network, wherein the call request is sent by an integrated access device (IAD) of the broadband network having a remote digital terminal (RDT) interface to a class 5 network switch of the circuit switch network having an integrated digital terminal (IDT) interface;

determining a destination of the call and a path by which to route the call to the destination using the gateway device, wherein the path includes at least one of the broadband network associated with the IAD and a circuit switched network associated with the class 5 network switch, wherein determining the path to the destination the gateway device determines whether the destination is only accessible via the circuit switch network;

accessing, by the gateway device, the class 5 network switch only if the path to the destination is only accessible via the circuit switched network; and routing the call by the gateway device via the path independent of a quality of the broadband network, wherein resources associated with the class 5 network switch and circuit switched network are not used unless the path to the destination is only accessible via the circuit switched network, wherein the at least one resource of the circuit switch network is a class 5 network switch of the circuit switch network.

2. The method of claim 1, wherein the gateway device appears as a digital loop carrier RDT to the class 5 network switch when the path to the destination is only accessible via the circuit switch network.

* * * * *